United States Patent
Calciu et al.

(10) Patent No.: US 11,544,194 B1
(45) Date of Patent: Jan. 3, 2023

(54) COHERENCE-BASED CACHE-LINE COPY-ON-WRITE

(71) Applicant: VMware, Inc., Palo Alto, CA (US)

(72) Inventors: Irina Calciu, Palo Alto, CA (US); Andreas Nowatzyk, San Jose, CA (US); Pratap Subrahmanyam, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/488,028

(22) Filed: Sep. 28, 2021

Related U.S. Application Data (60) Provisional application No. 63/225,408, filed on Jul. 23, 2021, provisional application No. 63/225,094, filed on Jul. 23, 2021.

(51) Int. Cl.
*G06F 12/00* (2006.01)
*G06F 12/084* (2016.01)

(52) U.S. Cl.
CPC ...... *G06F 12/084* (2013.01); *G06F 2212/622* (2013.01)

(58) Field of Classification Search
CPC .................................................. G06F 12/084
See application file for complete search history.

(56) References Cited

U.S. PATENT DOCUMENTS

| | | | |
|---|---|---|---|
| 10,761,984 B2 | 9/2020 | Calciu et al. | |
| 10,929,295 B2 | 2/2021 | Gandhi et al. | |
| 11,068,400 B2 | 7/2021 | Kolli et al. | |
| 11,099,991 B2 | 8/2021 | Kolli et al. | |
| 2008/0104337 A1* | 5/2008 | VelurEunni | G06F 9/544 710/22 |
| 2020/0034176 A1 | 1/2020 | Calciu et al. | |
| 2020/0034200 A1 | 1/2020 | Calciu et al. | |
| 2020/0034297 A1 | 1/2020 | Calciu et al. | |

OTHER PUBLICATIONS

Seshadri, V. et al. "Page Overlays: An Enhanced Virtual Memory Framework to Enable Fine-grained Memory Management," Proceedings of the 42nd Annual International Symposium on Computer Architecture (ISCA '15), Portland, OR, USA, Jun. 13-17, 2015, ACM 2015, 13 pages.

\* cited by examiner

*Primary Examiner* — Arvind Talukdar
(74) *Attorney, Agent, or Firm* — Kim & Stewart LLP (57) ABSTRACT

A method of performing a copy-on-write on a shared memory page is carried out by a device communicating with a processor via a coherence interconnect. The method includes: adding a page table entry so that a request to read a first cache line of the shared memory page includes a cache-line address of the shared memory page and a request to write to a second cache line of the shared memory page includes a cache-line address of a new memory page; in response to the request to write to the second cache line, storing new data of the second cache line in a second memory and associating the second cache-line address with the new data stored in the second memory; and in response to a request to read the second cache line, reading the new data of the second cache line from the second memory.

20 Claims, 8 Drawing Sheets

COHERENCE-BASED CACHE-LINE COPY-ON-WRITE

CROSS-REFERENCE TO RELATED APPLICATIONS

This application claims the benefit of U.S. Provisional Application No. 63/225,408, filed Jul. 23, 2021, and U.S. Provisional Application No. 63/225,094, filed Jul. 23, 2021, which are incorporated by reference herein.

BACKGROUND

Copy-on-Write (CoW) mechanisms are often used to create a lightweight copy of a group of memory pages or a process's memory without creating a copy on the spot. The memory pages are protected, and both copies point to a single physical frame containing the data. Only if the data between the copies diverges, because one of the copies gets modified, does the single physical frame actually get copied to a different location to store the modified data. For example, Redis®, a key-value store application, uses CoW and fork to create a snapshot of its in-memory database and saves it to disk in the forked process. If the main Redis process modifies its in-memory data while the secondary process is writing the snapshot to disk, the affected memory pages trigger a minor page fault, and the data is duplicated, each process now using different physical frames.

There are two problems with CoW when applied to memory pages. First, CoW uses write protection mechanisms to detect when one of the memory pages is modified, which incurs overhead for the affected process. Second, the granularity of the copy is always the size of a memory page. Currently, 4 KB memory pages are primarily used, but with applications increasingly employing larger memory pages, such as 2 MB or 1 GB, e.g., in virtual machine applications, copying the entire memory page takes a long time and consumes a large amount of memory, even though the amount of the diverging data is small.

SUMMARY

One or more embodiments provide a copy-on-write technique that is implemented at a granularity of cache lines. Because copy-on-write is executed for the cache line instead of an entire page containing the cache line, the overhead of copying is significantly reduced, especially when the size of the page is large, e.g., 2 MB or 1 GB page sizes which are more common in virtual machine applications. The benefits of sharing are still maintained, and no change to the hypervisor or operating system kernel is needed.

A method of performing a copy-on-write on a shared memory page that is shared by at least a first process running in a processor and a second process running in the processor and includes a plurality of cache lines that are stored in a first memory is carried out by a device communicating with the processor via a coherence interconnect and according to a cache coherence protocol. The method includes: adding a page table entry to pages tables of the first process so that a request to read a first cache line of the shared memory page made by the first process includes a first cache-line address, which is a cache-line address of the shared memory page and a request to write to a second cache line of the shared memory page made by the first process includes a second cache-line address, which is a cache-line address of a new memory page; in response to the request to write to the second cache line made by the first process, storing new data of the second cache line included in the request in a second memory and updating a data structure to associate the second cache-line address with the new data stored in the second memory; and in response to a request to read the second cache line made by the first process, the request including the second cache-line address, reading the new data of the second cache line from the second memory.

Further embodiments include a non-transitory computer-readable storage medium comprising instructions that cause a computer system to carry out the above method, as well as a computer system configured to carry out the above method.

DETAILED DESCRIPTION

Figure 1A:
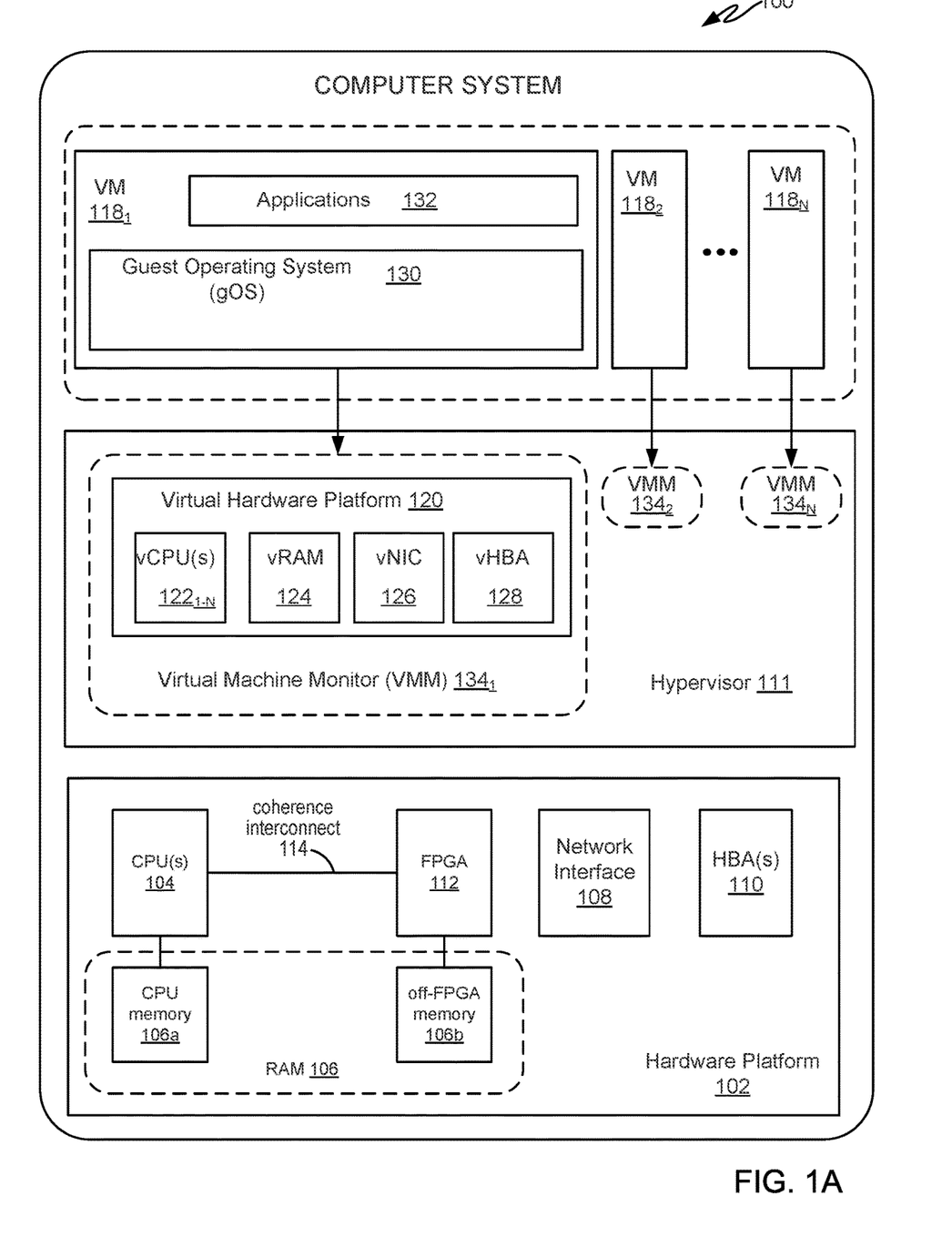
FIG. 1A depicts a block diagram of a computer system that is representative of a virtualized computer architecture in which embodiments may be implemented.

FIG. 1A is a block diagram of a computer system that is representative of a virtualized computer architecture in which embodiments may be implemented. As is illustrated, computer system 100 hosts multiple virtual machines (VMs) $118_1$-$118_N$ that run on and share a common hardware platform 102. Hardware platform 102 includes conventional computer hardware components, such as one or more items of processing hardware such as central processing units (CPUs) 104, random access memory (RAM) 106 as system memory, one or more network interfaces 108 for connecting to a network, and one or more host bus adapters (HBA) 110 for connecting to a storage system. In addition, hardware platform 102 includes a field-programmable gate array (FPGA) 112, which is installed in a CPU socket and communicates with one or more CPUs 104 via coherence interconnect 114. Coherence interconnect 114 may be any point-to-point coherence interconnect between processors, such as the Intel® UltraPath Interconnect (UPI), which is a successor to the Intel® QuickPath Interconnect (QPI), which supports a cache coherence protocol. In another embodiment, coherence interconnect 114 is a Compute Express Link™ (CXL™) operating with CXL-cache/mem protocols. Though the following description has the FPGA occupying a CPU socket, the embodiments are not so limited; any arrangement of the FPGA that includes a connection to the coherence interconnect among processors present in computer system 100 is sufficient.

A virtualization software layer, referred to hereinafter as hypervisor 111, is installed on top of hardware platform 102. Hypervisor 111 makes possible the concurrent instantiation and execution of one or more VMs $118_1$-$118_N$. The interaction of a VM 118 with hypervisor 111 is facilitated by the virtual machine monitors (VMMs) 134. Each VMM $134_1$-$134_N$ is assigned to and monitors a corresponding VM $118_1$-$118_N$. In one embodiment, hypervisor 111 may be a hypervisor implemented as a commercial product in VMware's vSphere® virtualization product, available from VMware Inc. of Palo Alto, Calif. In an alternative embodiment, hypervisor 111 runs on top of a host operating system which itself runs on hardware platform 102. In such an embodiment, hypervisor 111 operates above an abstraction level provided by the host operating system.

After instantiation, each VM $118_1$-$118_N$ encapsulates a virtual hardware platform that is executed under the control of hypervisor 111, in particular the corresponding VMM $134_1$-$134_N$. For example, virtual hardware devices of VM $118_1$ in virtual hardware platform 120 include one or more virtual CPUs (vCPUs) $122_1$-$122_N$, a virtual random access memory (vRAM) 124, a virtual network interface adapter (vNIC) 126, and virtual HBA (vHBA) 128. Virtual hardware platform 120 supports the installation of a guest operating system (guest OS) 130, on top of which applications 132 are executed in VM $118_1$. Examples of guest OS 130 include any of the well-known commodity operating systems, such as the Microsoft Windows® operating system, the Linux® operating system, and the like.

It should be recognized that the various terms, layers, and categorizations used to describe the components in FIG. 1A may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since each VMM includes the hardware emulation components for the virtual machine.

Figure 1B:
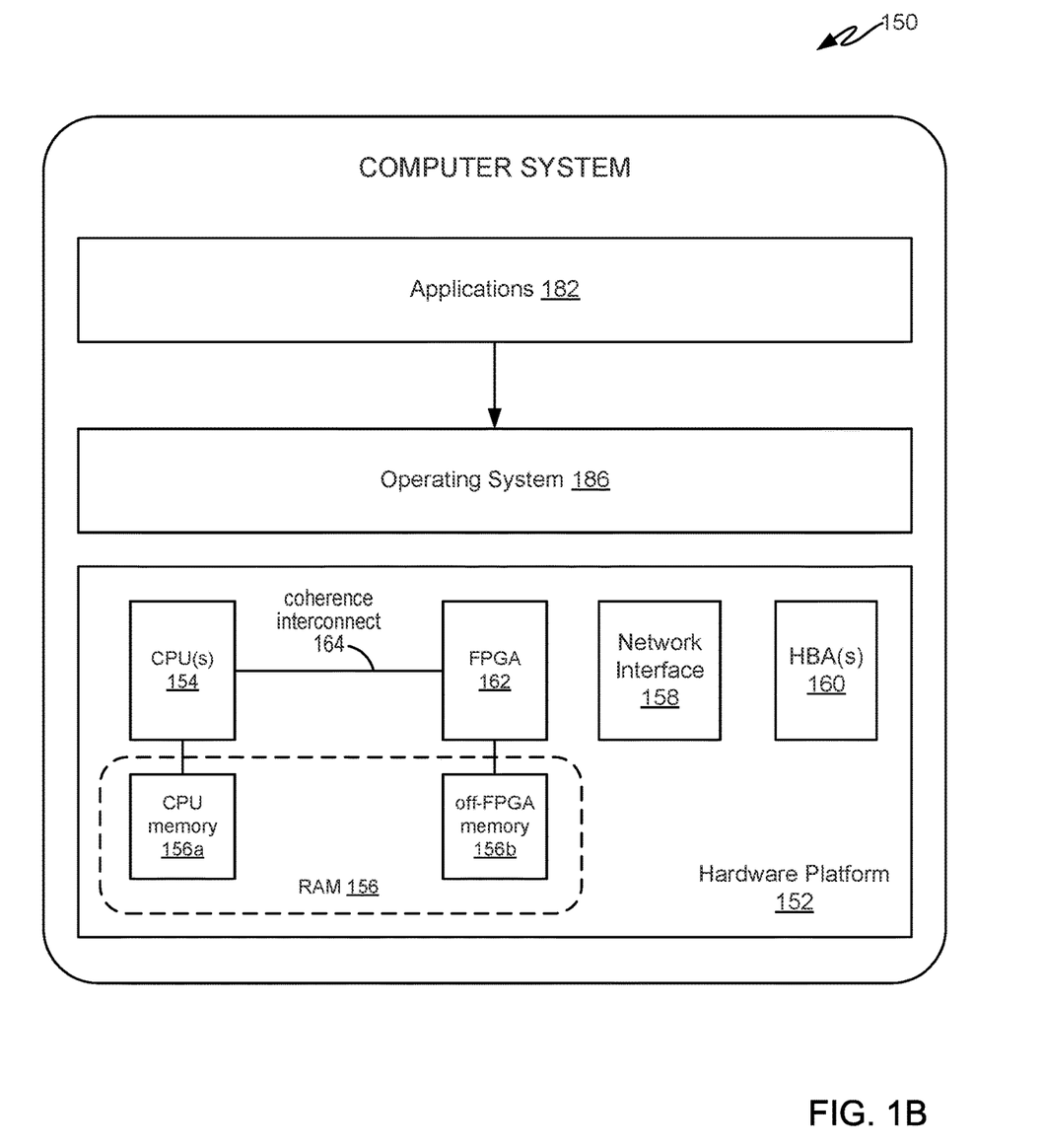
FIG. 1B depicts a block diagram of a computer system that is representative of a non-virtualized computer architecture in which embodiments may be implemented.

FIG. 1B is a block diagram of a computer system that is representative of an alternative computer architecture in which embodiments may be implemented. As illustrated, computer system 150 includes a hardware platform 152 that is similar to hardware platform 102. Hardware platform 152 includes conventional computer hardware components, such as one or more items of processing hardware such as central processing units (CPUs) 154, random access memory (RAM) 156 as system memory, one or more network interfaces 158 for connecting to a network, and one or more host bus adapters (HBA) 160 for connecting to a storage system. In addition, hardware platform 152 includes an FPGA 162, which is installed in a CPU socket and communicates with one or more CPUs 154 via coherence interconnect 164. Coherence interconnect 164 may be any point-to-point coherence interconnect between processors such as those identified above for coherence interconnect 114. Though the following description has the FPGA occupying a CPU socket, the embodiments are not so limited; any arrangement of the FPGA that includes a connection to the coherence interconnect among processors present in computer system 150 is sufficient. Hardware platform 152 supports the installation of an operating system 186, on top of which applications 182 are executed in computer system 150. Examples of an operating system 186 include any of the well-known commodity operating systems, such as the Microsoft Windows® operating system, the Linux® operating system, and the like.

Figure 2:
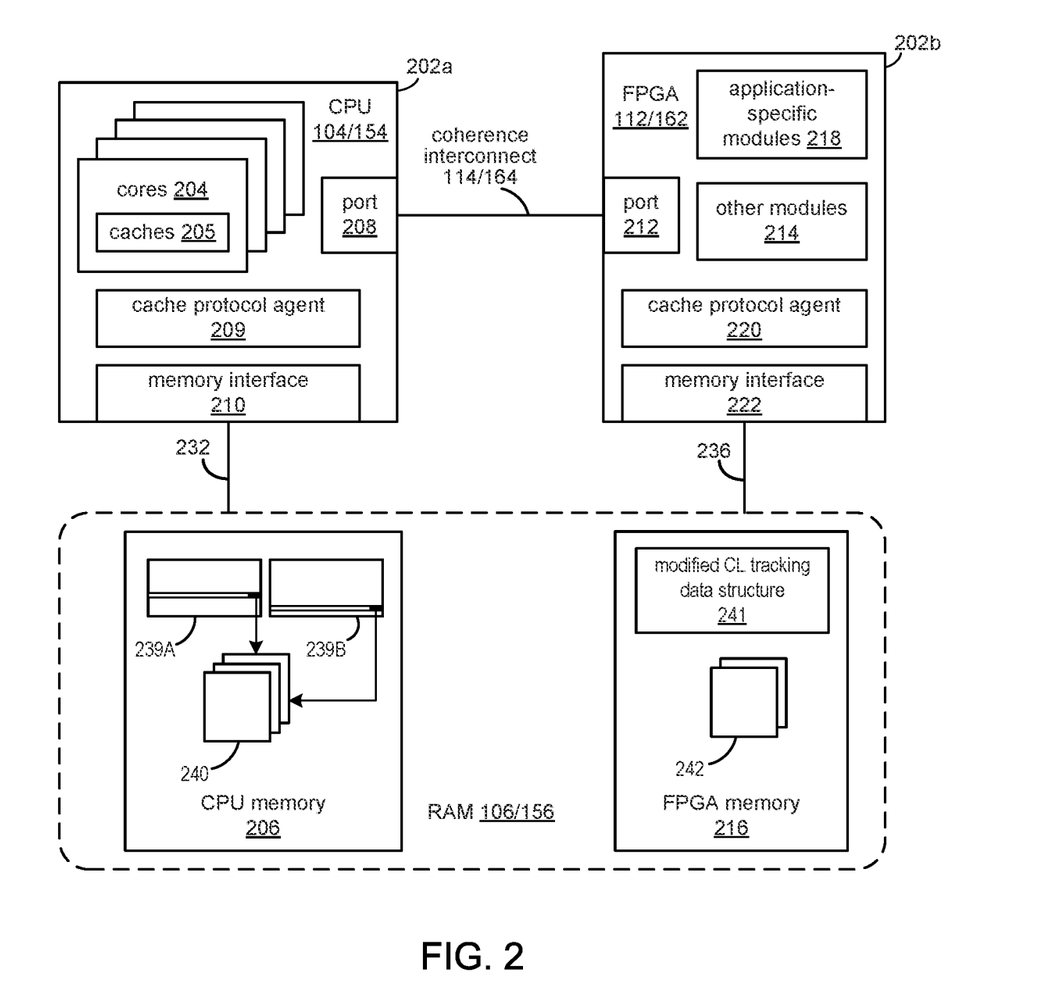
FIG. 2 depicts a block diagram of a pair of CPU sockets for a CPU and an FPGA, in an embodiment.

FIG. 2 depicts a block diagram of a pair of CPU sockets, a first socket 202a for a representative one of CPUs 104 (or CPUs 154), and a second socket 202b for an FPGA (e.g., FPGA 112 or FPGA 162). The CPU includes one or more processing cores 204, caches 205 for cores 204 (often implemented as a hierarchy of multiple cache levels), a cache protocol agent 209 for enforcing the cache coherence protocol, a communications port 208 connected to a coherence interconnect (e.g., coherence interconnect 114 or coherence interconnect 164), and a memory interface 210 connected via memory bus 232 to CPU memory 206, which is allocated from RAM 106 or RAM 156. The FPGA is configured with one or more application-specific modules 218, a cache protocol agent 220 for enforcing the cache coherence protocol, a communications port 212 connected to coherence interconnect 114, 164, and a memory interface 222 connected via memory bus 236 to FPGA memory 216, which is allocated from RAM 106 or RAM 156. Other modules 214, whose operations are unrelated to application-specific modules 218, also may be configured in FPGA 112. In one embodiment, each CPU socket, 202a, 202b, represents a separate Non-Uniform Memory Access (NUMA) domain.

As is well known, caches 205 are used to reduce the average cost to access data from memory. Data is transferred between CPU memory 206 and caches 205 in blocks of fixed size, called cache lines or cache blocks. When a cache line is copied from CPU memory 206 into caches 205, a cache entry is created, which includes both the copied data and the requested memory location (called a tag). When the CPU requests to read or write a location in CPU memory 206, caches 205 first check for a corresponding entry contained therein. That is, caches 205 search for the contents of the requested memory location in any cache lines that might contain that address. If the CPU finds that the memory location resides in caches 205, a cache hit has occurred, and the CPU immediately reads or writes the data in the cache line. However, if the CPU does not find the memory location in caches 205, a cache miss has occurred. For a cache miss, caches 205 allocate a new entry and copy data from CPU memory 206. The request is then fulfilled from the contents of caches 205.

Communication ports 208, 212, mentioned above, support a coherence protocol, which is designed to maintain cache coherence in a system with many processors, each having its own cache or caches. With the FPGA residing in one socket 202b of the CPU sockets and having its own communication port 212 that supports the coherence protocol, the FPGA can monitor and participate in the coherency protocol that keeps the processor caches coherent.

Cache coherence on the coherence interconnect is maintained according to a standard coherence protocol, such as modified, exclusive, shared, invalid (MESI) protocol or modified, exclusive, shared, invalid, forwarded (MESIF) protocol. In these protocols, cache lines marked invalid signify that the cache line has invalid data, and fresh data must be brought into caches 205 from CPU memory 206. Cache lines marked exclusive, shared, and forwarded (in the MESIF protocol) all signify that the cache line has valid data, but the cache line is clean (not modified), so the cache line can be discarded from the cache without writing data of the cache line back to CPU memory 206. A cache line marked as modified signifies the cache line is modified or dirty, and data of the cache line must be written back to CPU memory 206 before the cache line is discarded from caches 205.

Each cache protocol agent can initiate and respond to transactions on the coherence interconnect by sending and receiving messages on the coherence interconnect. In the embodiments illustrated herein, cache protocol agent 209 cooperates with cache protocol agent 220 by sending messages, including broadcast messages, over the coherence interconnect. In the protocol, one of the cache protocol agents is an owner of a set of cache lines and contains information regarding those cache lines. The other cache protocol agents send messages to the owner agent requesting a cache line or to find the status of the cache line owned by the owner agent. The owner agent may service the request directly or request that another cache protocol agent satisfy the request.

When the CPU accesses a cache line that is not in its caches 205, at any level of the cache hierarchy, it is cache protocol agent 209 of the CPU that requests the cache line from CPU memory 206. Thus, cache protocol agent 209 in CPU 104 issues a load cache-line transaction on the coherence interconnect. The transaction can be 'Load Shared' for sharing the cache line or 'Load Exclusive' for cache lines that will be modified. A cache line that is loaded as 'Shared' means that the line probably will not be modified. In contrast, a cache line that is loaded as 'Exclusive' is considered potentially dirty because it is not certain the cache line will be modified. When a cache line gets evicted from caches 205 to CPU memory 206, if it is modified, it must be written back to CPU memory 206 from which it originated. The operation of writing the cache line is performed on the coherence interconnect as a write-back transaction and can be monitored for tracking dirty cache lines. In the case of a write-back transaction, the cache line is actually dirty rather than potentially dirty. In the description that follows, a writeback transaction is converted to and handled as a message, 'WB_Data CL.'

To confirm whether a cache line is dirty or not, a cache protocol agent, such as cache protocol agent 220 in the FPGA, can snoop the cache line in accordance with the coherence interconnect protocol. If the cache line is dirty, the snoop triggers a write-back transaction, thereby exposing the dirty cache line that was residing in the processor cache. Cache protocol agents 209 and 220 also have information regarding the cache lines that are resident in the processor caches. This information is accessible via the coherence interconnect.

Memory pages that are shared by multiple processes in the embodiments illustrated herein are depicted as shared memory pages 240. Page tables of two different processes that are sharing memory pages are depicted as page tables 239A and page tables 239B. As is well known, page tables contain page table entries (PTEs), each of which stores an address of a memory page. In FIG. 2, a PTE from each of page tables 239A and page tables 239B is depicted as storing the address of one of shared memory pages 240. In the same manner, each of the other shared memory pages 240 would have two or more PTEs storing the address thereof.

In the embodiments, as cache lines of shared memory pages 240 are modified, the FPGA tracks the modified cache lines in a data structure 241. Data structure 241 is depicted in FIG. 3B and further described below. The tracking of the modified cache lines using data structure 241 is further described below in conjunction with FIG. 7.

Further, in the embodiments, when the number of modified cache lines of a shared memory page becomes large enough, the FPGA consolidates all cache lines, both modified and unmodified, into a single memory page. The single memory page is depicted as one of memory pages 242 stored in FPGA memory 216.

Figure 3:
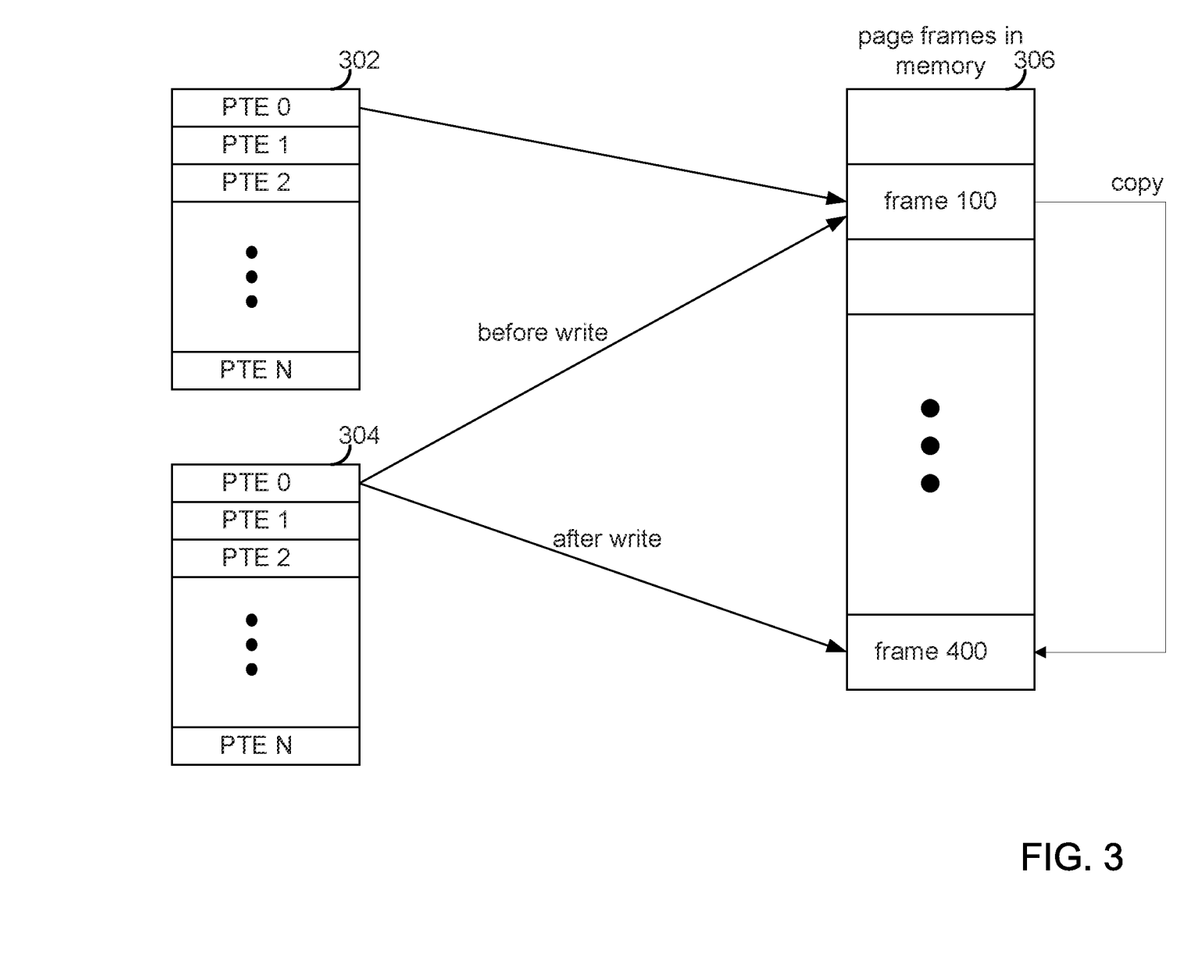
FIG. 3 depicts page tables for a pair of processes illustrating a copy-on-write process.

FIG. 3 depicts a copy-on-write operation for a shared memory page that is referenced by PTEs in page tables of two different processes, Process 1 and Process 2. As illustrated, Process 1 and Process 2 employ page tables 302 and 304, respectively, with entry PTE 0 that points to shared frame 100 of memory pages 306 prior to a write to a location in frame 100. When process 2 performs a write to a memory page having entry PTE 0, which, as described above, is carried out in units of cache lines, shared frame 100 is copied into frame 400, and the written cache line is updated in frame 400. PTE 0 entry for process 2 is changed to now point to frame 400. Thus, in the process, a copy of frame 100 was created and then updated because the entire frame 100 cannot be shared after the write. In a conventional implementation of copy-on-write (CoW), a write protection bit in the PTE of the shared memory page is set so that it is 'read-only' and a reference count equal to the number of processes sharing the memory page is maintained. In this conventional implementation, when a write to the shared memory page occurs, a page-fault occurs due to the 'read-only' setting in the PTE, causing an exception and subsequent entry into the hypervisor or OS kernel. The hypervisor or OS kernel then copies contents of the shared memory page to a new frame and reduces the reference count of the shared memory page by one.

Figure 4A:
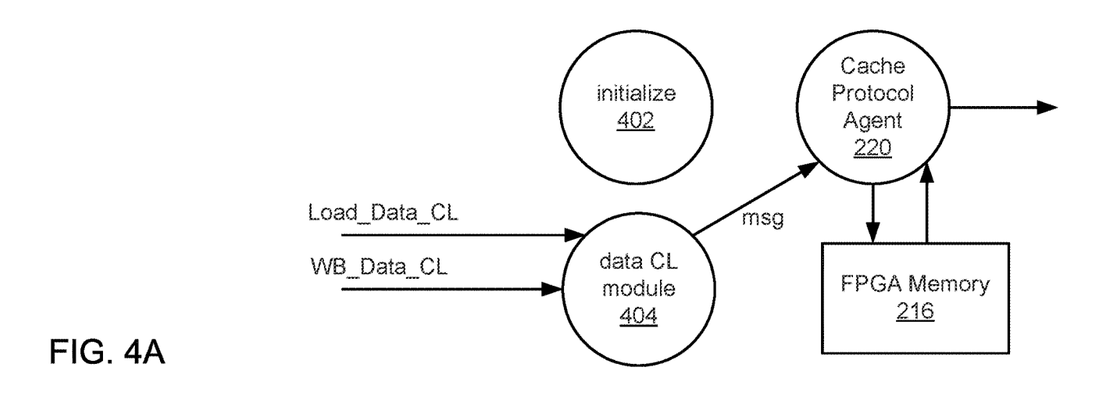
FIG. 4A depicts graphically the components involved in the remote operations, in an embodiment.

Embodiments employ a copy-on-write implementation that avoids page faults. FIG. 4A depicts the components involved in the copy-on-write implementation according to embodiments. The components include an initialize function 402, a dataCL module 404, cache protocol agent 220, and FPGA memory 216. In one embodiment, initialize function 402 and dataCL module 404 are implemented in the FPGA (FPGA 112 or FPGA 162) as application-specific modules 218. In operation, dataCL module 404 receives messages 'Load_Data_CL,' and 'WB_Data_CL' from the coherence interconnect 114 and sends messages to cache protocol agent 220. Cache protocol agent 220 employs memory interface 222 to store the CL address and cache line data in data structure 241.

Figure 4B:
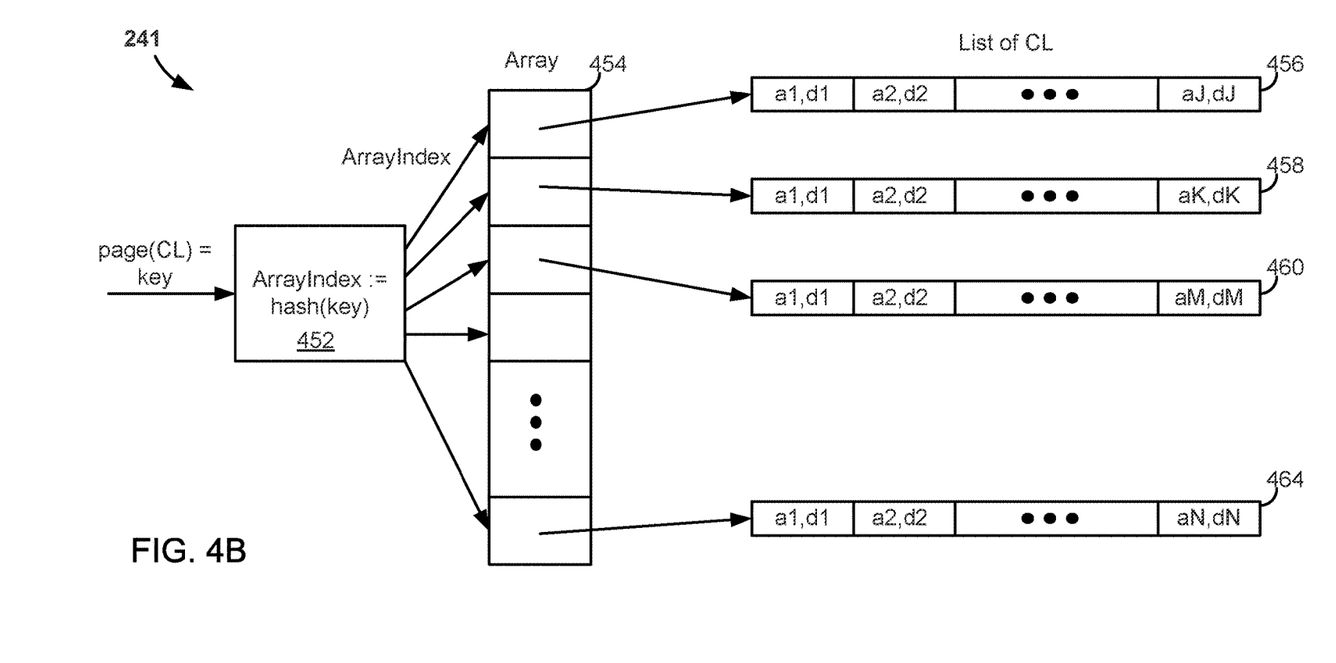
FIG. 4B depicts a data structure in FPGA memory for tracking modified cache lines, according to an embodiment.

FIG. 4B depicts data structure 241 in additional detail. Data structure 241 includes an index array 454 and a number of cache-line lists 456, 458, 460, and 464. A hash function 452 takes an address of a memory page that contains a cache line that is being modified as the key and generates an array index for one of the entries in array 454. Each entry in array 454 points to one of the lists 456-464 of cache lines, and each element in a list includes a cache-line address a1-aJ and corresponding data d1-dJ. Accordingly, each of the lists corresponds to a different memory page and stores addresses and data of cache lines in that memory page that have been modified.

Figure 5:
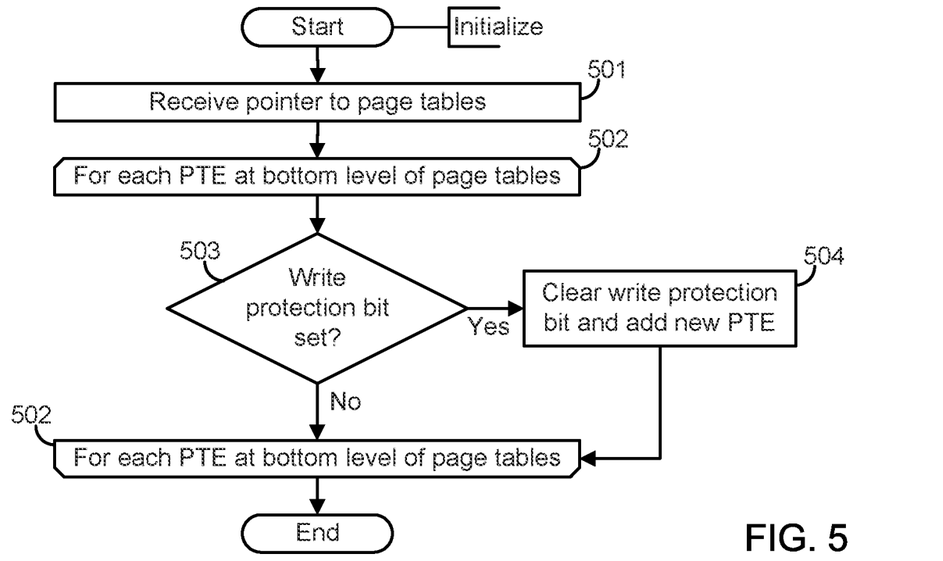
FIG. 5 depicts a flow of operations for an initialize function.

FIG. 5 depicts a flow of operations for initialize function 402. The initialize function receives in step 501 from system software (e.g., hypervisor 111 or OS 186) a pointer to page tables of each application program (VM 118 or application 182) that will employ copy-on-write according to embodiments. The initialize function then iterates in step 502 over all of the PTEs of memory pages for the application program, and for each PTE, checks the write protection bit and the reference count in step 503. If the write protection bit is set and the reference count is 2 or more (step 503; Yes), the initialize function clears the write protection bit and adds a new PTE that contains an alias for a new memory page in step 504. If the write protection bit is not set (step 503; No), the initialize function skips step 504.

Figure 6:
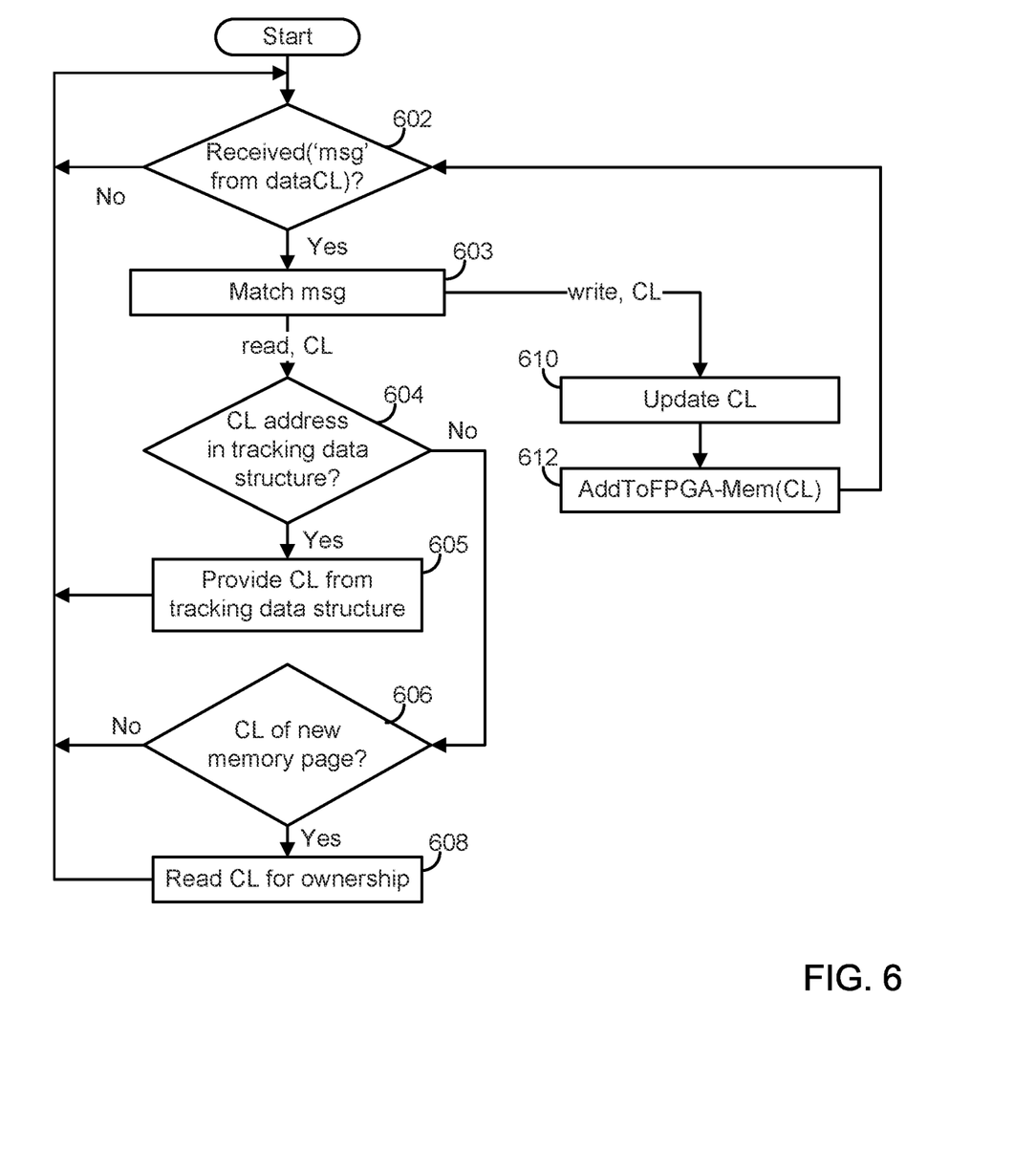
FIG. 6 depicts a flow of operations of a coherence protocol agent that manages a read or a write on a cache line of a shared memory page, according to embodiments.

FIG. 6 depicts a flow of operations of a coherence protocol agent (e.g., cache protocol agent 220), according to an embodiment. In step 602, the agent awaits the receipt of a message from dataCL module 404, and executes step 603 when the message is received. In step 603, the agent matches the message to either a (read, CL) message or a (write, CL) message.

If the agent receives a (read, CL) message, the agent inputs the address of the memory page containing the cache line into hash function 452 of data structure 241 to index into one of the lists and then determine whether the CL address is that list (step 604). If the CL address is in one of the lists of data structure 241 (step 604; Yes), the agent provides the corresponding CL data in the list to the requestor via the coherence interface in step 605. If the CL address is not in one of the lists of data structure 241 (step 604; No), the agent determines in step 606 whether the CL is a cache line of a new memory page (i.e., one of new memory pages for which aliases were created in step 504 of FIG. 5). If so (step 606; Yes), the agent reads the same CL to become the owner of the CL in step 608. If not (step 606; No), the agent does not take any action and allows the CL read to be carried out by the current owner of the CL.

If the agent receives a (write, CL) message, the agent updates in step 610 the CL, which it obtained in step 608. Then, in step 612, the agent calls the function AddToFPGA-Mem (described below with reference to FIG. 7) to add the updated CL to one of the lists in data structure 241.

Figure 7:
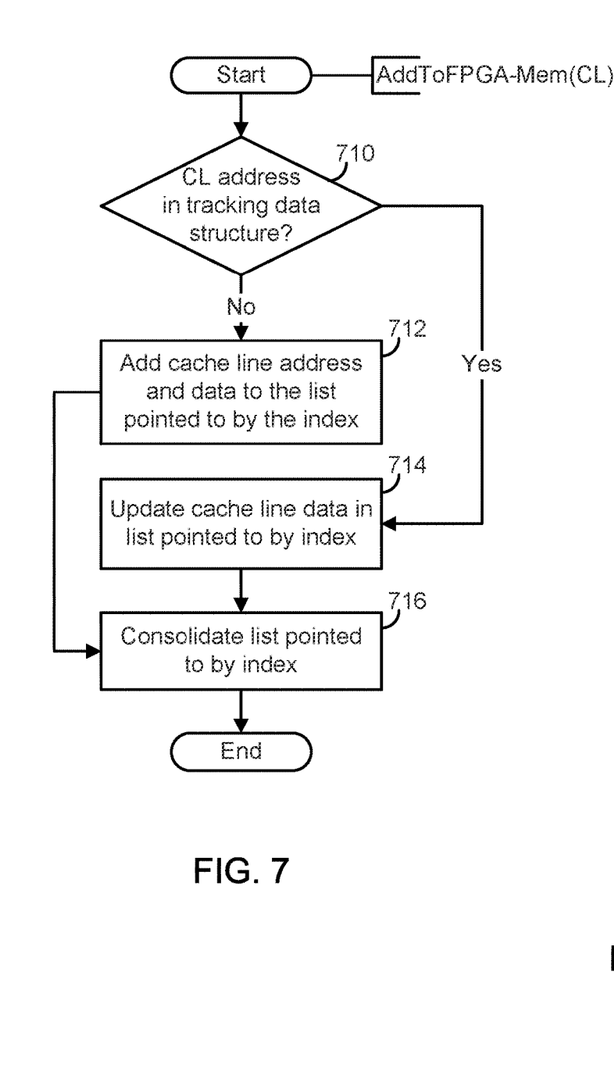
FIG. 7 depicts a flow of operations of a function that updates the data structure of FIG. 4B.

FIG. 7 depicts a flow of operations of the AddToFPGA-Mem function carried out one of application-specific modules 218. In step 710, the module inputs the address of the memory page containing the cache line into hash function 452 of data structure 241 to index into one of the lists and then determine whether the CL address is that list. If the list does not contain the CL address (step 710; No), the module adds the CL address and data to the list (step 712). If the list contains the CL address (step 710; Yes), the module updates the data in the list corresponding to the CL address (step 714). After either step 712 or 714, the module calls the Consolidate function in step 716 to determine if the list that is pointed to by the index and just updated has become too large and thus should become part of a new memory page that contains all cache lines, both modified and unmodified.

Figure 8:
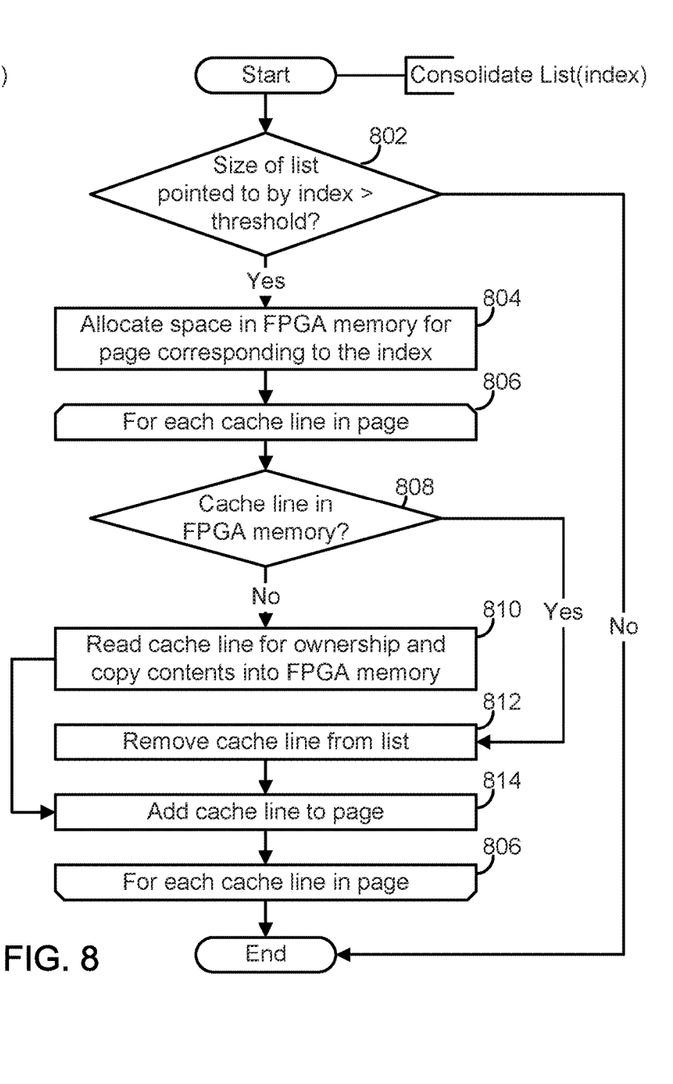
FIG. 8 depicts a flow of operations of a function that consolidates all cache lines, both modified and unmodified, into a single memory page.

FIG. 8 depicts a flow of operations of the Consolidate function, executed by one of application-specific modules 218, to consolidate all cache lines, both modified and unmodified, into a new memory page allocated in FPGA memory 216. In step 802, the module determines whether the size of the list pointed to by the index is greater than a given threshold e.g., the list contains more than half the cache lines of the memory page. If so, in step 804, the module allocates space in FPGA memory 216 for the new memory page corresponding to the index. In step 806, the module starts an iterator over all of the cache lines of the page. In step 808, the module determines whether the cache line already resides in FPGA memory 216 as a result of an earlier CL write (executed in step 712 or step 714) that resulted in the CL being stored in data structure 241. If not, the module in step 810 reads the cache line for ownership, and in step 814 adds the cache line to the new memory page. If the cache line already resides in FPGA memory 216, as determined in step 808, the module in step 812 removes the cache line from data structure 241, and in step 814 adds the cache line to the new memory page. Adding the cache line to the new memory page in step 812 and removing the cache line from data structure 241 may be performed by pointers to avoid moving data. When the iteration is complete, the new memory page has all of its cache lines, whether modified or not, residing in FPGA memory 216.

Figure 9:
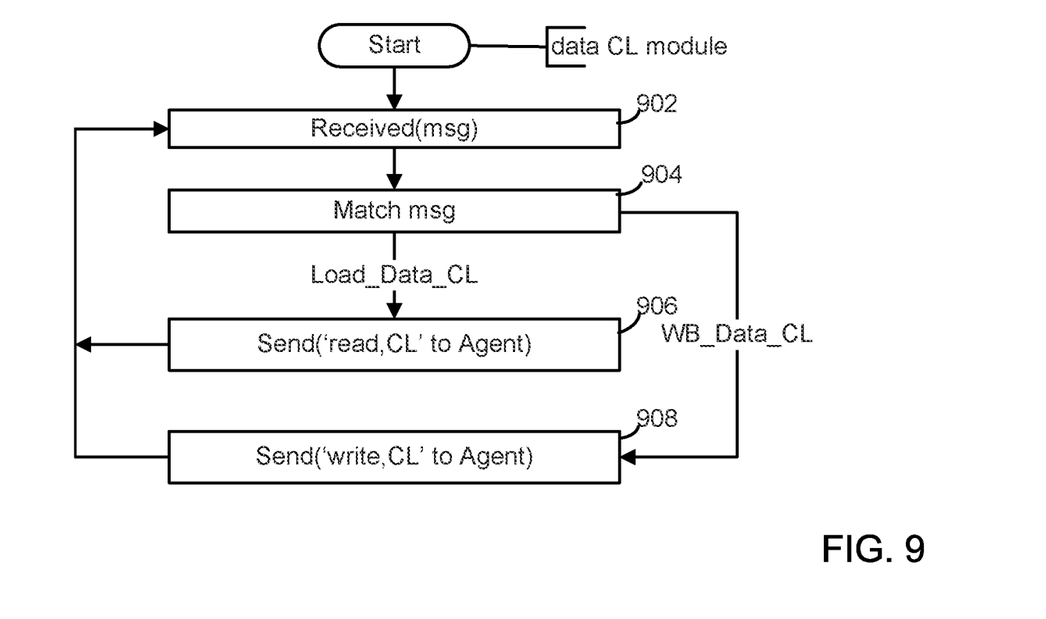
FIG. 9 depicts a flow of operations of a module that listens to activity on a coherence interconnect.

FIG. 9 depicts a flow of operations of dataCL module 404. In step 902, the module receives a message and, in step 904, matches the message to one of two events on the coherence interconnect. If the message is a 'Load_Data_CL' from the coherence interconnect, the module sends a (read, CL) message in step 906 to the coherence protocol agent, where CL includes the address of the cache line. If the message is a 'WB_Data_CL' from the coherence interconnect, the module sends a (write, CL) message in step 908 to the coherence protocol agent, where CL includes the address and data of the cache line being modified.

Certain embodiments as described above involve a hardware abstraction layer on top of a host computer. The hardware abstraction layer allows multiple contexts to share the hardware resource. These contexts are isolated from each other in one embodiment, each having at least a user application program running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application program runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application program and its dependencies. Each OS-less container runs as an isolated process in user space on the host operating system and shares the kernel with other containers. The OS-less container relies on the kernel's functionality to make use of resource isolation (CPU, memory, block I/0, network, etc.) and separate namespaces and to completely isolate the application program's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained only to use a defined amount of resources such as CPU, memory, and I/0.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations, including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system. Computer-readable media may be based on any existing or subsequently developed technology for embodying computer programs in a manner that enables them to be read by a computer. Examples of a computer-readable medium include a hard drive, network-attached storage (NAS), read-only memory, random-access memory (e.g., a flash memory device), a CD (Compact Discs)—CD-ROM, a CDR, or a CD-RW, a DVD (Digital Versatile Disc), a magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of performing a copy-on-write on a shared memory page that is shared by at least a first process running in a processor and a second process running in the processor and includes a plurality of cache lines that are stored in a first memory, the method being carried out by a device communicating with the processor via a coherence interconnect and according to a cache coherence protocol, comprising:
    adding a page table entry to pages tables of the first process so that a request to read a first cache line of the shared memory page made by the first process includes a first cache-line address, which is a cache-line address of the shared memory page and a request to write to a second cache line of the shared memory page made by the first process includes a second cache-line address, which is a cache-line address of a new memory page;
    in response to the request to write to the second cache line made by the first process, storing new data of the second cache line included in the request in a second memory and updating a data structure to associate the second cache-line address with the new data stored in the second memory; and
    in response to a request to read the second cache line made by the first process, the request including the second cache-line address, reading the new data of the second cache line from the second memory.

2. The method of claim 1, wherein the first memory is a local memory of the processor and the second memory is a local memory of the device.

3. The method of claim 1, further comprising:
    detecting requests to read from or write to cache lines on the coherence interconnect,
    wherein the detected requests include the request to write to the second cache line made by the first process and the request to read the second cache line made by the first process.

4. The method of claim 3, wherein the detected requests include a request to read the first cache line and no response is provided by the device to the request to read the first cache line.

5. The method of claim 4, further comprising:
    in response to the request to read the second cache line made by the first process, determining that the second cache-line address is present in the data structure and is associated with the new data stored in the second memory.

6. The method of claim 4, further comprising:
    in response to the request to read the first cache line, determining that the first cache-line address is not present in the data structure and that the first cache-line address is not a cache-line address of the new memory page.

7. The method of claim 1, further comprising:
    determining that the number of cache-line addresses of the new memory page that are present in the data structure is greater than a threshold number;
    allocating space in the second memory for the new memory page;
    copying unmodified cache lines of the shared memory page into the allocated space; and
    creating pointers in the new memory page to associate cache-line addresses of the modified cache lines of the new memory page with the data stored in the second memory.

8. A computer system for performing a copy-on-write on a shared memory page, said computer system comprising:
    a processor that is running first and second processes that share the shared memory page that includes a plurality of cache lines that are stored in a first memory; and
    a device communicating with the processor via a coherence interconnect and according to a cache coherence protocol, wherein the device is configured to:
    add a page table entry to pages tables of the first process so that a request to read a first cache line of the shared memory page made by the first process includes a first cache-line address, which is a cache-line address of the shared memory page and a request to write to a second cache line of the shared memory page made by the first process includes a second cache-line address, which is a cache-line address of a new memory page;
    in response to the request to write to the second cache line made by the first process, store new data of the second cache line included in the request in a second memory and update a data structure to associate the second cache-line address with the new data stored in the second memory; and
    in response to a request to read the second cache line made by the first process, the request including the second cache-line address, read the new data of the second cache line from the second memory.

9. The computer system of claim 8, wherein the first memory is a local memory of the processor and the second memory is a local memory of the device.

10. The computer system of claim 8, wherein the device is further configured to:
  detect requests to read from or write to cache lines on the coherence interconnect,
  wherein the detected requests include the request to write to the second cache line made by the first process and the request to read the second cache line made by the first process.

11. The computer system of claim 10, wherein the detected requests include a request to read the first cache line and no response is provided by the device to the request to read the first cache line.

12. The computer system of claim 11, wherein the device is further configured to:
  in response to the request to read the second cache line made by the first process, determine that the second cache-line address is present in the data structure and is associated with the new data stored in the second memory.

13. The computer system of claim 11, wherein the device is further configured to:
  in response to the request to read the first cache line, determine that the first cache-line address is not present in the data structure and that the first cache-line address is not a cache-line address of the new memory page.

14. The computer system of claim 8, wherein the device is further configured to:
  determine that the number of cache-line addresses of the new memory page that are present in the data structure is greater than a threshold number;
  allocate space in the second memory for the new memory page;
  copy unmodified cache lines of the shared memory page into the allocated space; and
  create pointers in the new memory page to associate cache-line addresses of the modified cache lines of the new memory page with the data stored in the second memory.

15. A non-transitory computer-readable medium comprising instructions that are executable in a computer system to carry out a method for performing a copy-on-write on a shared memory page, wherein the computer system includes a processor that is running first and second processes that share the shared memory page that includes a plurality of cache lines that are stored in a first memory, and a device communicating with the processor via a coherence interconnect and according to a cache coherence protocol instructions, said method comprising:
  adding a page table entry to pages tables of the first process so that a request to read a first cache line of the shared memory page made by the first process includes a first cache-line address, which is a cache-line address of the shared memory page and a request to write to a second cache line of the shared memory page made by the first process includes a second cache-line address, which is a cache-line address of a new memory page;
  in response to the request to write to the second cache line made by the first process, storing new data of the second cache line included in the request in a second memory and updating a data structure to associate the second cache-line address with the new data stored in the second memory; and
  in response to a request to read the second cache line made by the first process, the request including the second cache-line address, reading the new data of the second cache line from the second memory.

16. The non-transitory computer-readable medium of claim 15, wherein the method further comprises:
  detecting requests to read from or write to cache lines on the coherence interconnect,
  wherein the detected requests include the request to write to the second cache line made by the first process and the request to read the second cache line made by the first process.

17. The non-transitory computer-readable medium of claim 16, wherein the detected requests include a request to read the first cache line and no response is provided by the device to the request to read the first cache line.

18. The non-transitory computer-readable medium of claim 17, wherein the method further comprises:
  in response to the request to read the second cache line made by the first process, determining that the second cache-line address is present in the data structure and is associated with the new data stored in the second memory.

19. The non-transitory computer-readable medium of claim 17, wherein the method further comprises:
  in response to the request to read the first cache line, determining that the first cache-line address is not present in the data structure and that the first cache-line address is not a cache-line address of the new memory page.

20. The non-transitory computer-readable medium of claim 15, wherein the method further comprises:
  determining that the number of cache-line addresses of the new memory page that are present in the data structure is greater than a threshold number;
  allocating space in the second memory for the new memory page;
  copying unmodified cache lines of the shared memory page into the allocated space; and
  creating pointers in the new memory page to associate cache-line addresses of the modified cache lines of the new memory page with the data stored in the second memory.

* * * * *